US009499167B2

(12) United States Patent
Vorobieva et al.

(10) Patent No.: US 9,499,167 B2
(45) Date of Patent: Nov. 22, 2016

(54) AUTOMATIC SLOT PARKING STRATEGY

(71) Applicant: RENAULT s.a.s., Boulogne-Billancourt (FR)

(72) Inventors: Helene Vorobieva, Saint-Cloud (FR); Nicoleta Minoiu Enache, Versailles (FR); Sebastien Glaser, Fontenay-le-Fleury (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/421,544

(22) PCT Filed: Jul. 22, 2013

(86) PCT No.: PCT/FR2013/051765
§ 371 (c)(1),
(2) Date: Feb. 13, 2015

(87) PCT Pub. No.: WO2014/027154
PCT Pub. Date: Feb. 20, 2014

(65) Prior Publication Data
US 2015/0307089 A1     Oct. 29, 2015

(30) Foreign Application Priority Data
Aug. 14, 2012   (FR) ...................................... 12 57793

(51) Int. Cl.
| G05D 1/00 | (2006.01) |
| G08G 1/065 | (2006.01) |
| B62D 15/02 | (2006.01) |
| B60W 30/06 | (2006.01) |
| B60W 50/14 | (2012.01) |

(52) U.S. Cl.
CPC .............. *B60W 30/06* (2013.01); *B60W 50/14* (2013.01); *B62D 15/027* (2013.01); *B62D 15/028* (2013.01)

(58) Field of Classification Search
CPC ... B60W 30/06; B60W 50/14; B62D 15/027; B62D 15/028
See application file for complete search history.

(56) References Cited

U.S. PATENT DOCUMENTS 5,742,141 A * 4/1998 Czekaj ............... B62D 15/0285
180/167
2001/0017591 A1* 8/2001 Kuriya ..................... B60R 1/00
340/932.2

(Continued)

FOREIGN PATENT DOCUMENTS

| DE | 10 2005 037 468 | 2/2007 |
| DE | 10 2010 001 288 | 7/2011 |
| EP | 2 234 085 | 9/2010 |

OTHER PUBLICATIONS

French Search Report Issued Apr. 5, 2013 in Priority Application No. 1257793 Filed Aug. 14, 2012.

(Continued)

*Primary Examiner* — Mary Cheung
(74) *Attorney, Agent, or Firm* — Oblon, McClelland, Maier & Neustadt, L.L.P.

(57) ABSTRACT

The present invention relates to a method for assistance in the parking of a vehicle from a roadway into a free parking space, by one or more maneuvers of the slot parking type, comprising the following steps:
 determination of the length of the free parking space,
 determination of an optimum path to be followed by the movement of the vehicle by successive arcs of a circle,
characterized in that it comprises a step for determining the number of maneuvers $N_m$ needed in order to bring the vehicle into the parking space and in that these maneuvers are implemented when this number of maneuvers $N_m$ is less than a threshold $S_2$.

10 Claims, 3 Drawing Sheets

(56) References Cited

U.S. PATENT DOCUMENTS

| | | | |
|---|---|---|---|
| 2006/0271278 A1* | 11/2006 | Sakakibara | B62D 15/0275 701/523 |
| 2008/0125939 A1* | 5/2008 | Luke | B62D 15/027 701/41 |
| 2010/0070139 A1* | 3/2010 | Ohshima | B60R 1/00 701/42 |
| 2010/0156671 A1 | 6/2010 | Lee et al. | |
| 2010/0274446 A1 | 10/2010 | Sasajima et al. | |
| 2010/0332080 A1 | 12/2010 | Bae | |
| 2011/0057782 A1* | 3/2011 | Chundrlik, Jr. | B60R 1/00 340/436 |

OTHER PUBLICATIONS

International Search Report Issued Feb. 13, 2014 in PCT/FR13/051765 Filed Jul. 22, 2013.

\* cited by examiner

AUTOMATIC SLOT PARKING STRATEGY

BACKGROUND OF THE INVENTION

The present invention relates to the field of parking aids for automobile vehicles, and more particularly, entirely automatic parking aid systems for performing parking maneuvers of the slot type.

Carrying out slot-type maneuvers is often a source of stress, caused by the difficulty in carrying out these maneuvers, which can be associated with the appreciation of various parameters in the performance of these maneuvers which are notably, the appropriateness of the parking space to the length of the vehicle, the initial positioning of the vehicle, the sequencing of the parking maneuvers, etc., which may also lead to risks of degradation of the vehicle being maneuvered and of the vehicles adjacent to the parking space targeted.

In addition, the temporary blocking of the road traffic is also a source of stress due to the annoyance caused to the other car drivers.

Thus, semi-automatic devices for assisting maneuvers for the slot parking of vehicles have been developed with the aim of facilitating this operation. These devices are based on methods for planning the path to be followed which can be divided into several groups:

Methods based on the use of reference functions. For example, these may use the Lyapunov function for stabilizing the vehicle onto a line corresponding to the parking space, then onto a precise point of the parking space. They may also use sinusoidal functions with various gains so as to converge toward a path to be followed for entering into the parking space. For these methods, the behavior of the vehicle is essentially dependant on the parameters chosen and the drawback of these methods is the risk of not converging toward a path to be followed that may be performed by the vehicle within the space available.

Methods based on fuzzy logic based on learning human behavior. These methods do not require planning of a path to be followed but they are limited to the experience of human experts and are difficult to generalize.

Methods for planning in two steps: firstly, a collisionless path is created without taking into account the constraints of the vehicle, then this path is continually subdivided into points until all the points may be connected by paths that are feasible for the vehicle.

Geometrical methods which are based on arcs of circles that are feasible for the vehicle without collision and which bring the vehicle into its parking space. The paths to be followed resulting from these methods may be simply expressed using geometrical equations.

From the document US2009/0260907, an automation of the steering is for example known for maneuvering for entry into a parking slot in one or two maneuvers depending on the length of the space available with respect to the dimensions of the vehicle to be parked. It turns out, as a consequence, that this minimum length of the parking space is important, which gives rise to a severe limitation on the free parking space and can, in the case where the space is judged to be too small, lead to the frustration of the driver seeing the system refuse such a parking space which he/she him/herself thinks has sufficient room, albeit with the application of several maneuvers. The driver is then obliged to carry out these annoying parking maneuvers him/herself which are indeed those that he/she would have preferred not to have to do.

Moreover, these parking strategies in one or two maneuvers require that the vehicle is correctly positioned for the start of the maneuver, in other words that it is parallel to the parking space, and at a distance that is well defined with respect to the geometrical calculations for performing the maneuver (arcs of a circle corresponding to the maximum steering lock of the vehicle).

One of the aims of the invention is thus to provide a parking strategy allowing a vehicle to be guided into a free space whenever the free parking slot allows the car to be contained, taking into account the maneuvers needed to bring the vehicle into said space.

Another aim of the invention is to inform the driver of the parking possibilities when a free space is located.

Another aim of the invention is to provide an entirely automatic maneuver, where the driver does not intervene in the parking maneuvers, the vehicle potentially even being unoccupied during the maneuvers.

SUMMARY OF THE INVENTION

The present invention is achieved by a method for assistance in the parking of a vehicle from a roadway into a free parking space, by one or more maneuvers of the slot parking type, comprising the following steps:
  determination of the length of the free parking space,
  determination of an optimum path to be followed by the movement of the vehicle by successive arcs of a circle,
  characterized in that it comprises a step for determining the number of maneuvers needed to bring the vehicle into the parking space and in that these maneuvers are implemented when this number of maneuvers is less than a threshold.

According to other complementary characteristics:
  the method comprises a step for informing the driver of the number of maneuvers to be carried out, together with a step for validation by the driver of said number of maneuvers to be carried out, the maneuvers being implemented after the validation by the driver,
  the method comprises an increase of the threshold when no occupant of the vehicle is present inside of the vehicle during the maneuvers,
  the first maneuver consists of a first arc of a circle bringing the vehicle inside of the free parking space and of a second arc of a circle bringing the vehicle parallel with a maximum steering angle,
  the later maneuvers consist of back and forth movements from one side to the other of the free parking space, the vehicle being directed toward the interior of the free parking space over a first part of the path then brought back parallel to the free parking space over a second part of the path.

BRIEF DESCRIPTION OF THE DRAWINGS

Other features and advantages of the invention will become more clearly apparent upon reading the following description, with reference to the appended figures, amongst which.

DETAILED DESCRIPTION OF THE INVENTION

Figure 1:
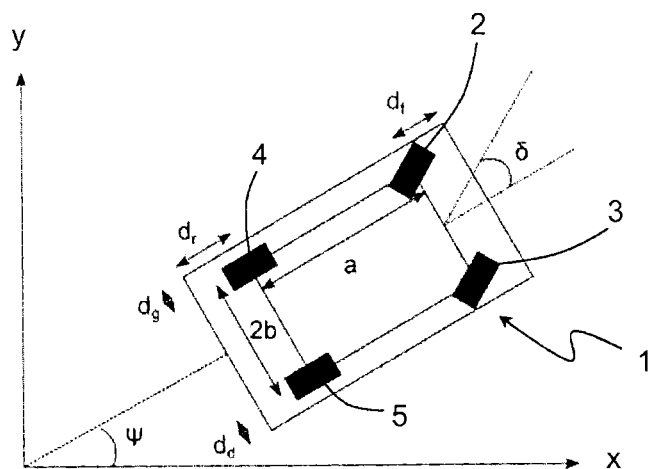
FIG. 1 is a representation of a vehicle and shows the various associated notations.

The present invention relates to the slot parking maneuvers allowing a vehicle to be parked alongside a roadway. The vehicle taken as an exemplary application of the invention, such as shown in FIG. 1, is a vehicle of the automobile type, powered and driven by a motor or engine (not shown), comprising four wheels 2 to 5 (left front wheel 2, right front wheel 3, left rear wheel 4 and right rear wheel 5), the front wheels being the driven wheels.

The characteristic dimensions of the vehicle are needed for the various calculations of the path followed. The following are thus defined:
- a: the wheelbase of the vehicle
- 2b: the track of the vehicle,
- $d_f$: Forward overhang of the vehicle
- $d_r$: Rear overhang of the vehicle
- $d_g$: Distance between the left wheels and the left side of the vehicle
- $d_d$: Distance between the right wheels and the right side of the vehicle
- δ: Angle that the front wheels make with the longitudinal axis of the vehicle, $δ_g$ and $δ_d$ respectively denoting a when the vehicle turns to the left or to the right
- v: Longitudinal speed of the vehicle
- ψ: Heading angle of the vehicle in an absolute reference frame (x, y)

Figure 2:
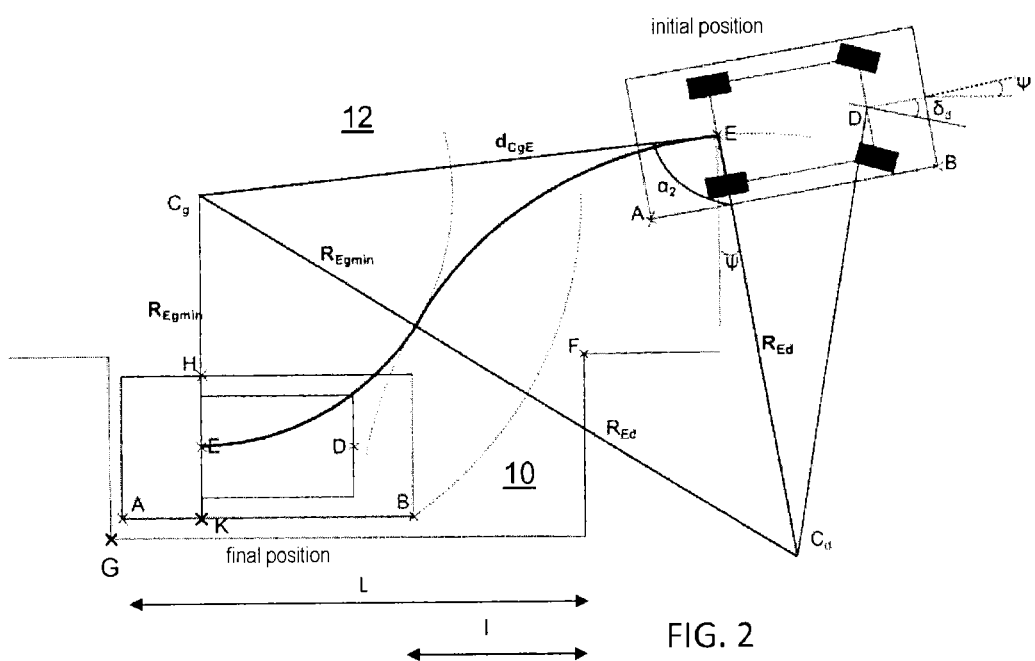
FIG. 2 shows a vehicle being parked in a free space with a single maneuver.

The vehicle is thus represented schematically as a rectangle where the points 3, A and B respectively define the left rear, right rear and right front corners of the vehicle, with reference to FIG. 2. The points D and E are also defined, which are, respectively, the mid-points of the front axle and of the rear axle. The instantaneous centers of rotation of the vehicle are denoted $C_g$ or $C_d$, depending on whether the wheels of the vehicle are turned to the left or to the right. The point H is also defined as the intersection between the left side of the car and the straight line connecting Cg to E, and the point K as the intersection between the right side of the car and the straight line connecting Cg to E.

The path that the vehicle has to follow in order to park takes into account the constraints of the vehicle (notably the dimensions, maximum steering angles) and the constraints of the environment (dimensions of the parking space, collision avoidance with the other parked vehicles during the maneuvers).

According to the invention, the strategy provided consists in reversing the maneuver or maneuvers for exiting the parking space. Thus, the vehicle is considered as parked, such as shown in FIG. 2, in a parking space 10, represented schematically by an empty rectangular space, of length L, surrounded, longitudinally, on either side, by occupied areas, either by vehicles or by urban furniture, or by restricted parking areas, said parking space having a side open to the roadway or traffic route 12.

The various maneuvers, based essentially on arcs of a circle with a radius of the maximum steering lock, are defined in order to allow the vehicle to get out of said space and to bring it to the real initial position of the vehicle, the various maneuvers being subsequently adopted in the reverse order so as to enable the vehicle to park.

The term 'maneuver' is understood to mean a sequence of various steering turns of the wheels without changing the sign of the speed of the vehicle.

In the simplest case, where the space is sufficiently large (essentially by the length, but also by the width) for the vehicle to be able to exit in one maneuver, the vehicle just needs to be steered full lock toward the side to exit the parking space by moving forward until the front of the vehicle has left the space (maneuver $M_2$) then to turn the steering wheel in the other direction in order to position the car on the roadway (maneuver $M_1$). This steering maneuver does not necessarily require full steering lock of the front wheels, because it depends on parameters such as the width of the road, the exiting conditions, the positioning of the vehicle parked immediately in front of the vehicle, the real initial position of the vehicle, etc.

Thus, during parking maneuvers, the maneuver $M_1$ will be carried out first, then the following maneuver $M_2$ in order to bring the vehicle into the parking space.

According to FIG. 2, the length of the parking space is denoted L and the difference between this value and the length of the vehicle (equal to $a+d_f+d_r$) is denoted I.

The vehicle must therefore exit via the left by turning the wheels full lock to the left. The length between the point E and the point $C_g$ when the wheels are turned full lock to the left will be denoted $R_{Egmin}$. During this maneuver, the point E therefore describes the arc of a circle with a center $C_g$ and with a radius $R_{Egmin}$. Similarly, the point B describes the arc of a circle with center $C_g$ and radius $R_{Bgmin}$. FIG. 2 shows that the maneuver really is possible, since this arc of a circle does not interfere with the top right corner of the parking space, denoted F, which can represent the rear left corner of a vehicle parked immediately in front of the free space.

Assuming that the maneuvers are performed at low speed, the movement of the vehicle takes place without any skidding. The arc of a circle from the point E, about the instantaneous center of rotation $C_g$, denoted $R_{Eg}$, is given by the formula: $R_{Eg}=a/\tan δ_g$. In a similar manner, the arc of a circle from the point D, about the instantaneous center of rotation $C_g$, denoted $R_{Dg}$, is given by the formula: $R_{Dg}=a/\sin δ_g$.

Exiting from the parking space in a single maneuver is possible if the radius $R_{Bgmin}$ is less than the distance from the point C to the point F, denoted $d_{CgF}$.

Generally, the distance between the point $C_g$ and the point B, denoted $R_{Bg}$, is given by the equation: $R_{Bg}=\sqrt{R_{Kg}^2+d_{KB}^2}$ according to Pythagorus' theorem, where $d_{KB}$ is the distance between the points K and B and $R_{Kg}$ is the distance between $C_g$ and K.

The geometrical configurations additionally yield the following equations:

$$d_{KB}=a+d_f$$

$$R_{Kg}=R_{Eg}+b+d_d$$

Furthermore, the vehicle is considered as parked if it does not "encroach" onto the roadway. With reference to FIG. 2, the vehicle is considered as parked if the measurement of the point H along the y axis of the absolute reference frame, denoted $y_H$, is less than the measurement of the point F along this same axis, denoted $y_F$.

In order to determine the minimum length $L_{min}$ of the parking space such that it is possible to park in a single maneuver, the limiting condition $y_H=y_F$ is therefore considered. It is furthermore considered that the car is parked parallel to the parking space, in such a manner that the triangle $C_g$-H-F is right-angular at H. The abscissa of the center $C_g$, denoted $x_G$, may be defined, when the vehicle is considered as parked, by the formula $x_G = x_H - d_r$, where $x_H$ is the abscissa of the point H, in the absolute frame of reference.

It then follows that the minimum length of the space is defined by the formula:

$$L_{min} = d_r + \sqrt{R_{Bgmin}^2 - \left(\frac{a}{\tan\delta_g} - b - d_g\right)^2}$$

In the case where $L_{min} \geq L$, the vehicle can exit from or enter into the parking space in a single maneuver, since the point B follows an arc of a circle with center $C_g$ and radius $R_{Bgmin}$. FIG. 2 shows the path in bold of the point E, describing an arc of a circle with center $C_g$ and radius $R_{Egmin}$, with the following relationship:

$$R_{Eg\,min} = \frac{a}{\tan(\delta_{g\,max})},$$

$\delta_{gmax}$ being the maximum steering angle to the left.

The final exit from the parking space is then obtained by turning the wheels to the right, which defines a rotation of the vehicle about the instantaneous center of rotation right $C_d$, the point E describing an arc of a circle of radius $R_{Ed}$ about this point.

In order for the maneuver to be feasible, it is necessary for this arc of a circle to have only a single point of intersection with the arc of a circle with center $C_g$ and radius $R_{Bgmin}$ defined previously.

The position of $C_g$ is defined by $x_{Cg} = x_E$ and $y_{Cg} = y_E + R_{Egmin}$. This allows the distance to be calculated between the initial position of E and the point $C_g$, denoted $d_{ECg}$.

In addition, even if neither the position of $C_d$ nor the length $R_{Ed}$ are known, it is known that $d_{CdCg} = R_{Egmin} + R_{Ed}$ and that the straight lines (E-Cd) and (E-D) are perpendicular. Knowing the initial orientation $\psi$ of the vehicle, the angle $C_g \hat{E} C_d$, denoted $\alpha_2$, can therefore be deduced.

By applying the theorem of Al-Kashi, the following is then found:

$$R_{Ed} = \frac{d_{ECg}^2 - R_{Egmin}^2}{2R_{Egmin} + 2d_{ECg}\cos\alpha_2}$$

which allows $\delta_d$ to be deduced:

$$\delta_d = \arctan\frac{a}{R_{Ed}}$$

In order to avoid a collision between the point A and the right-hand boundary of the parking space, in this case the point F (and hence to avoid the collision of the vehicle with the right-hand boundary), the distance between $C_d$ and A, denoted $R_{Ad}$, must be greater than the distance between $C_d$ and F, denoted $d_{CdF}$, and this condition is verified by the fact that the steering angle $\delta_g$ allows the car to exit without collision.

In order for the vehicle to be capable of following the arc of a circle with center $C_d$ and radius $R_{Ed}$, in the limiting case, the following must apply: $R_{Ed} = R_{Edmin} = a/\tan(\delta_{max})$. However, $R_{Edmin}$ is defined by the equation:

$$R_{Edmin} = \frac{d_{ECgmin}^2 - R_{Egmin}^2}{2R_{Egmin} + 2d_{ECgmin}\cos\alpha_2}$$

which leads to:

$$d_{ECgmin} = R_{Edmin}\cos\alpha_2 + \sqrt{R_{Edmin}^2\cos\alpha_2^2 + R_{Egmin}^2 + 2R_{Edmin}R_{Egmin}}$$

Thus, if $d_{ECg} < d_{ECgmin}$, the vehicle just needs to move until $d_{ECg} \geq d_{ECgmin}$ is satisfied, then the parking maneuver can begin.

In the case where the length of the parking space does not allow the vehicle to be parked in a single maneuver, the various maneuvers are based on the following principle: the vehicle is brought to the closest position parallel to the parking space and which allows it to get out with a single movement. The arcs of a circle to be followed during this step are calculated in the same way as previously described for parking with a single maneuver. Subsequently, the vehicle is moved by back and forth maneuvers between the forward and rear boundaries of the space so as to always be parallel to the parking at the start and at the end of each back and forth movement, while at the same time displacing the vehicle in y until the ordinate $y_E$ of the point E is less than or equal to the ordinate $y_F$ of the point F: in this case, the vehicle may be considered as being parked correctly, without protrusion onto the roadway. If it is desired that the vehicle be parked as near as possible to the sidewalk, it will be sought for the ordinate of point A to come as close as possible to that of the lower edge of the parking space.

Figure 3:
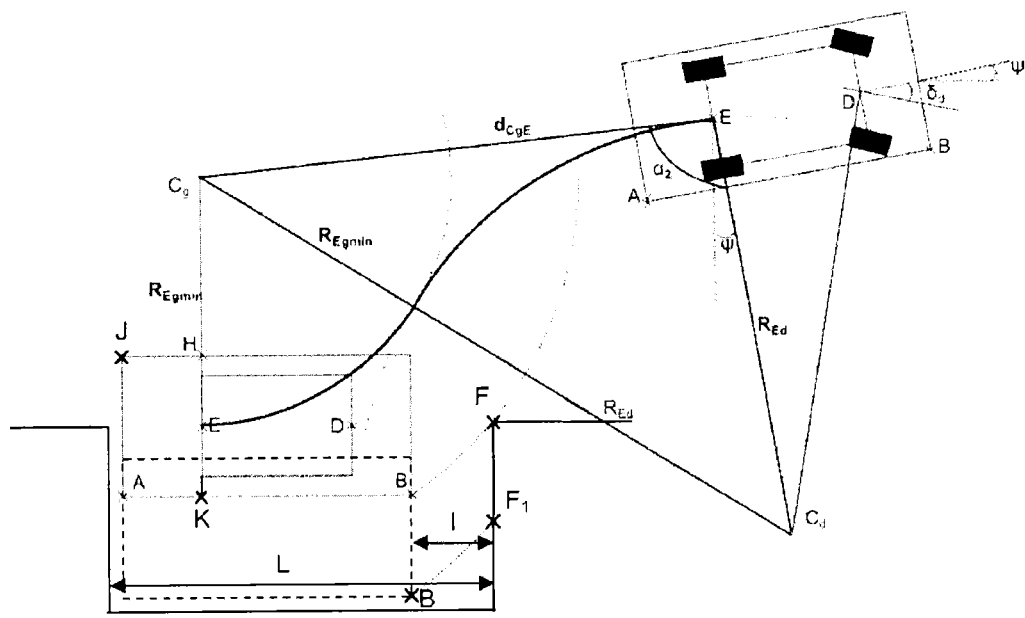
FIGS. 3 and 4 show steps for performing maneuvers according to the present invention.

Thus, FIG. 3 shows such a case, where the length L of the parking space does not allow parking with a single maneuver. The vehicle 1 is then brought from an initial position to an intermediate position in the manner described previously, where the distance between $C_g$ and F is equal to the distance between $C_g$ and B.

Figure 4:
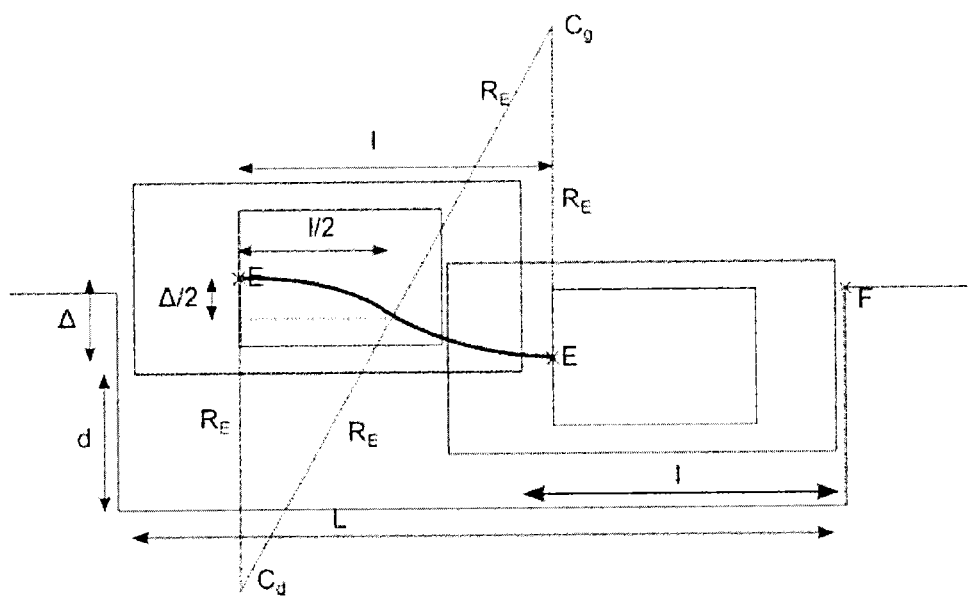

In this intermediate position, the vehicle is located at a distance d from the parking space. This distance may be envisioned differently depending on the desired final position. If it is desired for the vehicle to be parked without encroaching onto the roadway, $d = y_H - y_F$ with $y_H$ considered when the vehicle is located in the intermediate position. If it is desired for the vehicle to be parked as close as possible to the sidewalk, $d = y_B - y_G$ with $y_B$ considered when the vehicle is located in the Intermediate position. FIG. 4 illustrates d in this latter configuration. Other final positions may be envisioned. Generally, let $(x_{Efinal}, y_{Efinal})$ be the desired final position of the point E, with the vehicle parallel to the parking space, then $d = x_E - x_{Efinal}$, with $x_E$ considered when the vehicle is located in the intermediate position.

In principle, this intermediate position of the vehicle is unknown. It is deduced according to the final position of the vehicle and to the distance d. It is therefore necessary to calculate d. For this purpose, it is imagined that the vehicle is parked in the desired final position and that it tries to get out of the parking space by turning the wheels in full lock toward the left. In this case, the point B describes a circle with center $C_{Bg}$ and radius $R_{Bgmin}$. As the vehicle in not able to get out in a single maneuver, this circle intersects the right boundary of the parking space at a point $F_1$ (see FIG. 3).

Under these conditions, $y_{F1}$ is easily calculated and it is deduced from this that $e=y_F-y_{F1}$. However, if the vehicle is translated from the desired final position by the distance e along the ordinate axis, then by turning the wheels to the maximum toward the left, the circle described by the point B intersects the right-hand boundary of the parking at the point F. This is the limiting condition for non-collision with the parking and for exiting with a single maneuver. From this, it is deduced that d=e.

FIG. 4 illustrates the various maneuvers from the intermediate position. In order to facilitate understanding the description, the length of the space has been purposely enlarged, and a single maneuver is shown.

The vehicle is thus shown in a forward movement. Whilst the vehicle is travelling the length l/2, the steering is applied to the right, then during the remaining length l/2, the steering is applied to the left. In order to always be parallel to the parking space at the end of the maneuver and to maximize the lateral displacement, in order to simplify the calculations, the steering angle is considered as identical to the right and to the left, and is equal to the minimum value between the maximum values of angle of steering to the right and of steering to the left. This angle will be denoted δ. The turning radius of the point E, denoted $R_E$, to the right, and also to the left is defined by the relationship: $R_E=a/\tan \delta$.

It is then possible to calculate the lateral displacement Δ of the vehicle for one back and forth maneuver by the formula:

$$\Delta = 2\left(R_E - \sqrt{R_E^2 - \frac{l^2}{4}}\right)$$

The number of back and forth maneuvers $nb_{a-r}$ in order to go from the intermediate position to the final parked position is then given by the formula:

$$nb_{a-r} = IntegerPart\left(\frac{d}{\Delta}\right) + 1$$

Counting the first maneuver bringing the vehicle to the intermediate position, the total number of maneuvers $nb_m$ is then $nb_m=nb_{a-r}+1$.

According to one particularly advantageous embodiment of the invention, this parking strategy is implemented automatically after acceptance by the driver of the various maneuvers to be carried out.

Such an automatic implementation requires the vehicle to be equipped with various automatic systems for controlling the steering of the wheels, the acceleration, the braking, the change of speed, and notably for changing the direction of movement of the vehicle. It must also be equipped with one or more sensors allowing at least the length of the parking space to be measured when driving past it, for example an ultrasound sensor, a radar device or a camera. In the case where the sensors present does not allow the depth of the parking space to be measured, the vehicle must be equipped with a system allowing it to be deduced that the space really is a parking space (e.g.: camera with detection of adjacent vehicles, user interface with question of possibility of parking, etc.). The vehicle must also comprise one or more sensors allowing the distances to be measured from the front and the rear of the vehicle to the nearest obstacle (e.g.: wall, vehicle behind), for example camera, ultrasound sensor or laser telemeter.

A computer allows these various pieces of information to be managed and stored in order to carry out the various aforementioned processing steps.

In order to display the parking possibilities to the driver, the vehicle will preferably be equipped with a graphics or voice interface.

Figure 5:
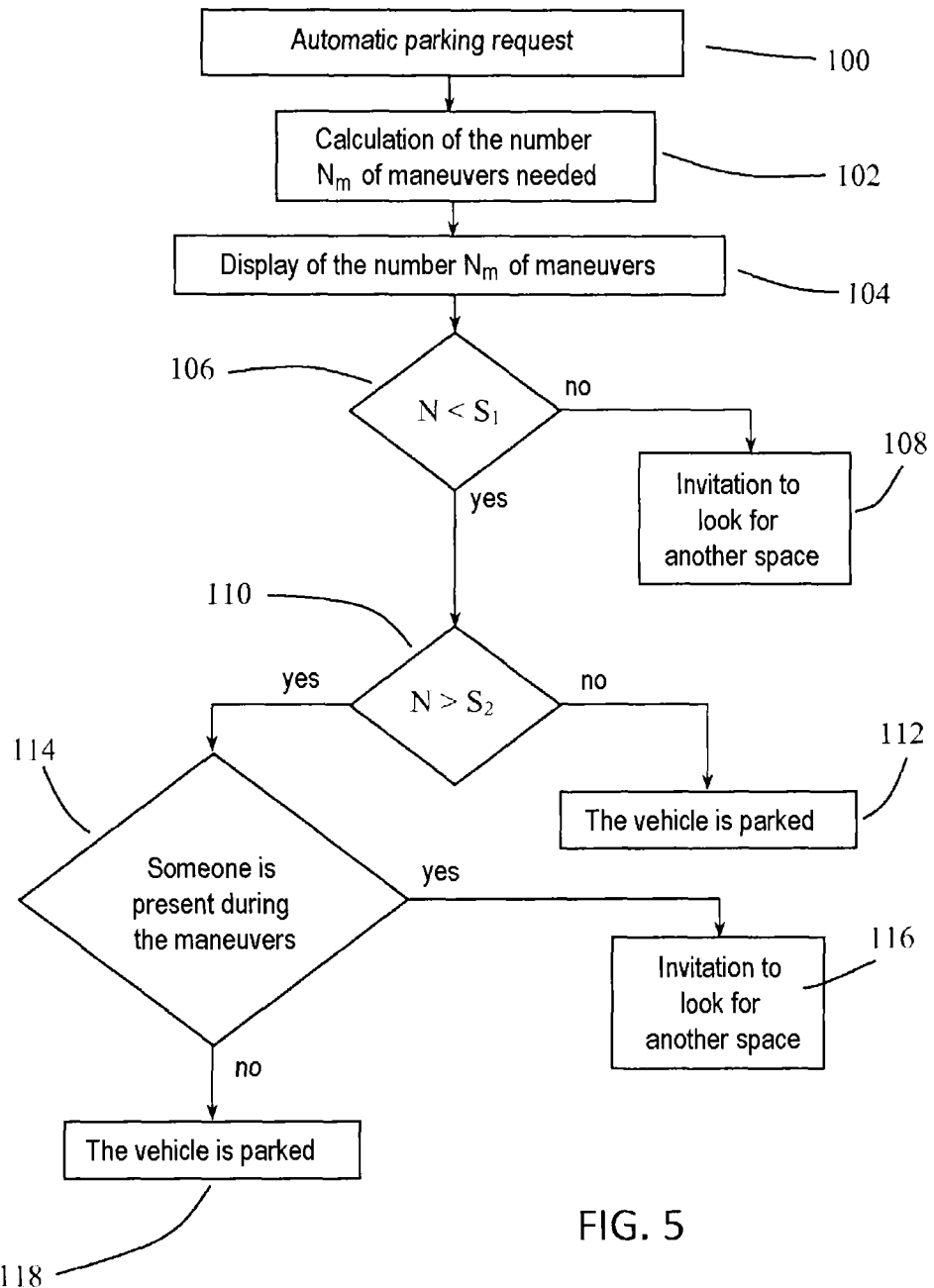
FIG. 5 is a flow diagram representing the parking strategy according to the invention.

FIG. 5 shows a flow diagram of one possible parking strategy according to the invention.

Thus, during a step 100, after having located a free parking space, the driver selects, via a suitable interface, a request for parking in the right or on the left, either by a suitable button or by the activation of the indicator. The cat is then driven in front of the free space in order that the sensors of the vehicle, associated with the computer allowing the characteristics of the free space to be determined.

During a step 102, in accordance with the description qui that has just been presented, the number $N_m$ of maneuvers is calculated, then displayed in a step 104. If the number of maneuvers is too high, in other words higher than a threshold $S_1$ fixed in advance, then the graphical Interface invites the driver, in a step 108, to look for another space. The threshold $S_1$ may, for example, be fixed at 10.

If this threshold is not exceeded, it is verified whether the number of maneuvers is greater than a second threshold $S_2$, hence lower than the first threshold. If this second threshold has not been reached, the vehicle begins the maneuver(s) for parking during a step 112. The threshold $S_2$ may be fixed at 5.

If this threshold is reached, the interface asks the driver if a person will be present in the vehicle during the maneuvers. Indeed, since the number of maneuvers is quite tedious, the maneuvers will be considered as acceptable if the vehicle is not occupied, which will avoid a passenger or a driver being stuck for the duration of the maneuvers. This option is not proposed when the threshold $S_1$ is exceeded, because it is then considered that the monopolization or the congestion of the road by the vehicle during the parking maneuvers is not socially acceptable.

Thus, if the response is that nobody will be present during the maneuvers, then the vehicle begins the maneuvers for parking during a step 118. Otherwise, the graphical interface invites the driver to look for another parking space in a step 116.

It is possible to leave the possibility to the driver to force the implementation of the parking maneuvers, when the threshold $S_2$ is exceeded, with the presence of a person during the maneuvers.

The present invention is also applicable, in a simpler version, to the case where the acceleration, braking and of change of direction controls are carried out by the driver, the user interface simply indicating the number of maneuvers to be carried out, where applicable, the impossibility of parking, and inviting the driver to carry out or otherwise these maneuvers

The invention claimed is:

1. A method for assistance in parking a vehicle from a roadway into a free parking space, by one or more maneuvers of a slot parking type, comprising:
   determining a length of the free parking space;
   determining an optimum path to be followed by a movement of the vehicle by successive arcs of a circle; and
   determining a number of maneuvers $N_m$ needed in order to bring the vehicle into the free parking space, the maneuvers being implemented when the number of maneuvers $N_m$ is less than a threshold such that the vehicle is parked without a driver operating the vehicle.

2. The method as claimed in claim 1, further comprising informing a driver of the number of maneuvers to be carried out, and obtaining validation by the driver of said number of maneuvers to be carried out, the maneuvers being implemented after the validation by the driver.

3. The method as claimed in claim 1, wherein the threshold is increased when no occupant of the vehicle is present inside of the vehicle during the maneuvers.

4. The method as claimed in claim 1, wherein a first maneuver includes a first arc of a circle bringing the vehicle inside of the free parking space and of a second arc of a circle bringing the vehicle parallel with a maximum steering angle.

5. The method as claimed in claim 4, wherein later maneuvers include back and forth movements from one side to the other of the free parking space, the vehicle being directed toward the interior of the free parking space over a first part of a path, then brought back parallel to the free parking space over a second part of the path.

6. The method as claimed in claim 1, further comprising determining the presence of a driver or a passenger in the vehicle.

7. The method as claimed in claim 6, further comprising determining whether the number of maneuvers $N_m$ is less than a first threshold and a second threshold, the first threshold being larger than the second threshold.

8. The method as claimed in claim 7, further comprising implementing the maneuvers without asking the driver or the passenger when the number of maneuvers $N_m$ is less than the second threshold.

9. The method as claimed in claim 7, further comprising implementing the maneuvers without asking the driver or the passenger when the number of maneuvers $N_m$ is less than the first threshold but equal to or more than the second threshold and when there is no driver or passenger in the vehicle.

10. A method for assistance in parking a vehicle from a roadway into a free parking space, by one or more maneuvers of a slot parking type, comprising:
   determining a length of the free parking space;
   determining an optimum path to be followed by a movement of the vehicle by successive arcs of a circle; and
   determining a number of maneuvers $N_m$ needed in order to bring the vehicle into the free parking space, the maneuvers being implemented when the number of maneuvers $N_m$ is less than a threshold,
   wherein the threshold is increased when no occupant of the vehicle is present inside of the vehicle during the maneuvers.

* * * * *